United States Patent [19]

Bass

[11] 3,787,785

[45] Jan. 22, 1974

[54] PHASE REPRESENTATIVE DIGITAL SIGNAL MODULATING APPARATUS

[75] Inventor: Larry F. Bass, Mission Viejo, Calif.

[73] Assignee: Collins Radio Company, Dallas, Tex.

[22] Filed: May 15, 1972

[21] Appl. No.: 253,094

[52] U.S. Cl. ............... 332/9 R, 178/66 R, 235/154, 325/163, 332/42

[51] Int. Cl. ............................................ H04l 27/20

[58] Field of Search ........... 332/9 R, 9 T, 11 R, 42; 235/154; 325/30, 163; 178/66 R

[56] References Cited

UNITED STATES PATENTS

| | | | |
|---|---|---|---|
| 3,095,539 | 6/1963 | Bennett et al. | 325/163 |
| 3,706,945 | 12/1972 | Yanagidaira et al. | 332/42 X |
| 3,597,599 | 8/1971 | Melvin | 235/154 |
| 3,668,562 | 6/1972 | Fritkin | 325/163 X |
| 3,617,889 | 11/1971 | Rabinowitz | 325/30 |
| 3,619,503 | 11/1971 | Ragsdale | 325/30 X |

*Primary Examiner*—Alfred L. Brody
*Attorney, Agent, or Firm*—Bruce C. Lutz

[57] ABSTRACT

Apparatus for combining two series of digital numbers from each of two different sources wherein the numbers represent phases of signals and for providing an output indicative of the modulation of one of the signals by the other signal with the output being an analog or digital number signal. The concept generally is shown in detail as applied to a differential phase shift keying transmitter where one of the sources of digital numbers is a time division multiplexed source of two signals and the other is a time base or clocking signal which modulates each of the time multiplexed signals from the first source on a raised cosine basis through the use of a look-up table in the form of a read only memory.

9 Claims, 21 Drawing Figures

| | R | S | T | U |
|---|---|---|---|---|
| 0 | 0 | 0 | 0 | 0 |
| 2 | 0 | 0 | 0 | 0 |
| 4 | 0 | 0 | 0 | 0 |
| 6 | 0 | 0 | 0 | 0 |
| 8 | 0 | .08 | .12 | .08 |
| 10 | 0 | .18 | .26 | .18 |
| 12 | 0 | .29 | .41 | .29 |
| 14 | 0 | .40 | .56 | .40 |
| 16 | 0 | .49 | .70 | .49 |
| 18 | 0 | .58 | .82 | .58 |
| 20 | 0 | .65 | .92 | .65 |
| 22 | 0 | .69 | .97 | .69 |
| | R | S | T | U |
|---|---|---|---|---|
| 24 | 0 | .71 | 1.00 | .71 |
| 26 | 0 | .69 | .97 | .69 |
| 28 | 0 | .65 | .92 | .65 |
| 30 | 0 | .58 | .82 | .58 |
| 32 | 0 | .49 | .70 | .49 |
| 34 | 0 | .40 | .56 | .40 |
| 36 | 0 | .29 | .41 | .29 |
| 38 | 0 | .18 | .26 | .18 |
| 40 | 0 | .08 | .12 | .08 |
| 42 | 0 | 0 | 0 | 0 |
| 44 | 0 | 0 | 0 | 0 |
FIG. 2d
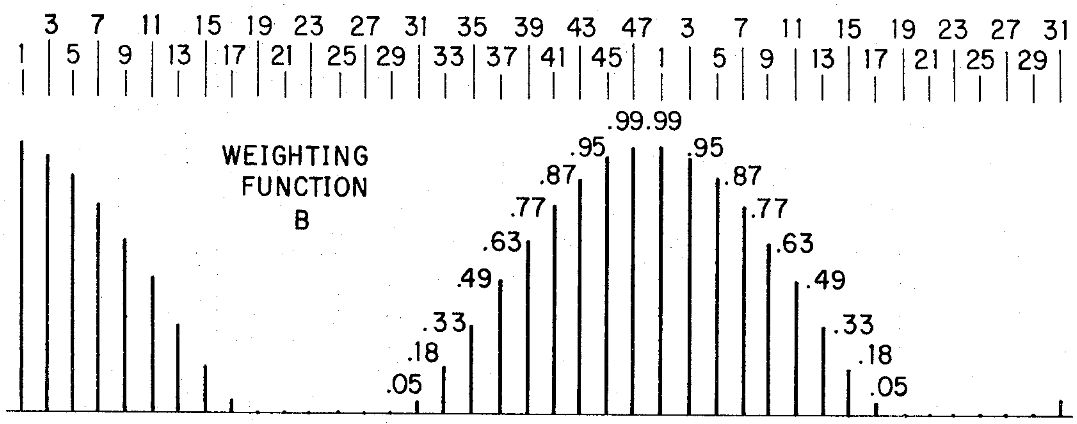
FIG. 3a
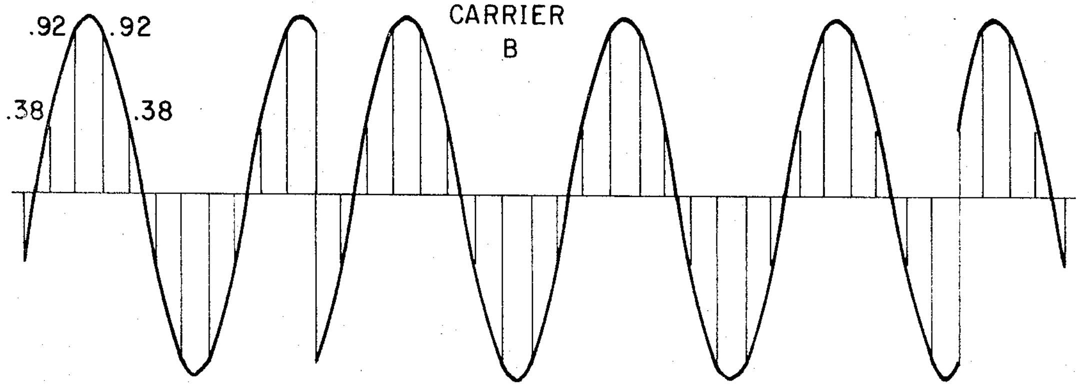
FIG. 3b

| | $B_1$ | $B_2$ | $B_3$ | S | $C_1$ | $COUNT_1$ | DECIMAL EQ OUT | $C_2$ | $COUNT_2$ | DECIMAL EQ OUT |
|---|---|---|---|---|---|---|---|---|---|---|
| CYCLE | 0 | 0 | 0 | 0 | 0 | 1 | 0 | 1 | 13 | 16 |
| CYCLE | 1 | 0 | 0 | 0 | 0 | 2 | 1 | 1 | 14 | 17 |
| CYCLE | 1 | 1 | 0 | 0 | 0 | 3 | 3 | 1 | 15 | 19 |
| CYCLE | 1 | 1 | 1 | 0 | 0 | 4 | 7 | 1 | 16 | 23 |
| CYCLE | 0 | 1 | 1 | 0 | 0 | 5 | 6 | 1 | 17 | 22 |
| CYCLE | 0 | 0 | 1 | 0 | 0 | 6 | 4 | 1 | 18 | 20 |
| | 0 | 0 | 0 | 1 | 0 | 7 | 8 | 1 | 19 | 24 |
| | 1 | 0 | 0 | 1 | 0 | 8 | 9 | 1 | 20 | 25 |
| | 1 | 1 | 0 | 1 | 0 | 9 | 11 | 1 | 21 | 27 |
| | 1 | 1 | 1 | 1 | 0 | 10 | 15 | 1 | 22 | 31 |
| | 0 | 1 | 1 | 1 | 0 | 11 | 14 | 1 | 23 | 30 |
| | 0 | 0 | 1 | 1 | 0 | 12 | 12 | 1 | 0 | 28 |

PATENTED JAN 22 1974

3,787,785

SHEET 06 OF 12

| COUNT | ROM POSITION | A 1 | 2 | 3 | 4 | 5 | 6 | 7 | 8 |
|---|---|---|---|---|---|---|---|---|---|
| 1 | 0 | 0 | 0 | 0 | 0 | -1 | -1 | -1 | -1 |
| 2 | 1 | 0 | 0 | 0 | 0 | -1 | -1 | -1 | -1 |
| | 2 | X | X | X | X | X | X | X | X |
| 3 | 3 | 0 | 0 | 0 | 0 | -1 | -1 | -1 | -1 |
| 6 | 4 | 0 | 9 | 13 | 9 | -1 | -10 | -14 | -10 |
| | 5 | X | X | X | X | X | X | X | X |
| 5 | 6 | 0 | 5 | 8 | 5 | -1 | -6 | -9 | -6 |
| 4 | 7 | 0 | 2 | 3 | 2 | -1 | -3 | -4 | -3 |
| 7 | 8 | 0 | 12 | 18 | 12 | -1 | -13 | -19 | -13 |
| 8 | 9 | 0 | 15 | 22 | 15 | -1 | -16 | -23 | -16 |
| | 10 | X | X | X | X | X | X | X | X |
| 9 | 11 | 0 | 18 | 26 | 18 | -1 | -19 | -27 | -19 |
| 12 | 12 | 0 | 22 | 31 | 22 | -1 | -23 | -32 | -23 |
| | 13 | X | X | X | X | X | X | X | X |
| 11 | 14 | 0 | 22 | 31 | 22 | -1 | -23 | -32 | -23 |
| 10 | 15 | 0 | 20 | 29 | 20 | -1 | -21 | -30 | -21 |
| 13 | 16 | 0 | 22 | 31 | 22 | -1 | -23 | -32 | -23 |
| 14 | 17 | 0 | 20 | 29 | 20 | -1 | -21 | -30 | -21 |
| | 18 | X | X | X | X | X | X | X | X |
| 15 | 19 | 0 | 18 | 26 | 18 | -1 | -19 | -27 | -19 |
| 18 | 20 | 0 | 9 | 13 | 9 | -1 | -10 | -14 | -10 |
| | 21 | X | X | X | X | X | X | X | X |
| 17 | 22 | 0 | 12 | 18 | 12 | -1 | -13 | -19 | -13 |
| 16 | 23 | 0 | 15 | 22 | 15 | -1 | -16 | -23 | -16 |
| 19 | 24 | 0 | 5 | 18 | 5 | -1 | -6 | -9 | -6 |
| 20 | 25 | 0 | 2 | 3 | 2 | -1 | -3 | -4 | -3 |
| | 26 | X | X | X | X | X | X | X | X |
| 21 | 27 | 0 | 0 | 0 | 0 | -1 | -1 | -1 | -1 |
| 0 | 28 | 0 | 0 | 0 | 0 | -1 | -1 | -1 | -1 |
| | 29 | X | X | X | X | X | X | X | X |
| 23 | 30 | 0 | 0 | 0 | 0 | -1 | -1 | -1 | -1 |
| 22 | 31 | 0 | 0 | 0 | 0 | -1 | -1 | -1 | -1 |

FIG. 12a

| COUNT | ROM POSITION | B | | | | | | | |
|---|---|---|---|---|---|---|---|---|---|
| | | 1 | 2 | 3 | 4 | 5 | 6 | 7 | 8 |
| 1 | 0 | 12 | 29 | 29 | 12 | -13 | -30 | -30 | -13 |
| 2 | 1 | 11 | 27 | 27 | 11 | -12 | -29 | -29 | -12 |
| | 2 | X | X | X | X | X | X | X | X |
| 3 | 3 | 10 | 25 | 25 | 10 | -11 | -26 | -26 | -11 |
| 6 | 4 | 6 | 14 | 14 | 6 | -7 | -15 | -15 | -7 |
| | 5 | X | X | X | X | X | X | X | X |
| 5 | 6 | 7 | 18 | 18 | 7 | -8 | -19 | -19 | -8 |
| 4 | 7 | 9 | 22 | 22 | 9 | -10 | -24 | -24 | -10 |
| 7 | 8 | 4 | 9 | 9 | 4 | -5 | -10 | -10 | -5 |
| 8 | 9 | 2 | 5 | 5 | 2 | -3 | -6 | -6 | -3 |
| | 10 | X | X | X | X | X | X | X | X |
| 9 | 11 | 0 | 1 | 1 | 0 | -1 | -2 | -2 | -1 |
| 12 | 12 | 0 | 0 | 0 | 0 | -1 | -1 | -1 | -1 |
| | 13 | X | X | X | X | X | X | X | X |
| 11 | 14 | 0 | 0 | 0 | 0 | -1 | -1 | -1 | -1 |
| 10 | 15 | 0 | 0 | 0 | 0 | -1 | -1 | -1 | -1 |
| 13 | 16 | 0 | 0 | 0 | 0 | -1 | -1 | -1 | -1 |
| 14 | 17 | 0 | 0 | 0 | 0 | -1 | -1 | -1 | -1 |
| | 18 | X | X | X | X | X | X | X | X |
| 15 | 19 | 0 | 0 | 0 | 0 | -1 | -1 | -1 | -1 |
| 18 | 20 | 4 | 9 | 9 | 4 | -5 | -10 | -10 | -5 |
| | 21 | X | X | X | X | X | X | X | X |
| 17 | 22 | 2 | 5 | 5 | 2 | -3 | -6 | -6 | -3 |
| 16 | 23 | 0 | 1 | 1 | 0 | -1 | -2 | -2 | -1 |
| 19 | 24 | 6 | 14 | 14 | 6 | -7 | -15 | -15 | -7 |
| 20 | 25 | 7 | 18 | 18 | 7 | -8 | -19 | -19 | -8 |
| | 26 | X | X | X | X | X | X | X | X |
| 21 | 27 | 9 | 22 | 22 | 9 | -10 | -24 | -24 | -10 |
| 0 | 28 | 12 | 29 | 29 | 12 | 13 | 30 | 30 | 13 |
| | 29 | X | X | X | X | X | X | X | X |
| 23 | 30 | 11 | 27 | 27 | 11 | -12 | -29 | -29 | -12 |
| 22 | 31 | 10 | 25 | 25 | 10 | -11 | -26 | -26 | -11 |

FIG. 12b

PHASE REPRESENTATIVE DIGITAL SIGNAL MODULATING APPARATUS

THE INVENTION

The present invention is related generally to modulating apparatus and more specifically to apparatus for utilizing two sets of signals each of which is a digital number representative of the phase of a signal and combining these two signals to provide an output which is indicative of one of the signals modulated by the other signal.

While it is realized that there are many types of modulators in the prior art, these modulators have been generally unsatisfactory for any modulation techniques wherein the generation of the signal to be modulated or the modulating signal was a complex function and whereby the signal was difficult to generate. The present invention utilizes a simple concept of producing the digital numbers representative of phase and then converting these numbers to an analog representation of one of the signals modulated by the other. This conversion technique may take place in a look-up table wherein the phase of one of the signals is used as one of the inputs to the table and the phase of the other signal is used as a second input and an output is obtained, which may be unique to that set of numbers or may be common to various sets of numbers depending upon the design of the look-up table. The output is then converted in a digital to analog converter to produce the analog output. The conversion means may also comprise other techniques such as converting the digital numbers representing phase into digital numbers representing amplitude for the particular signals involved and then multiplying these two sets of signals on a repetitive consecutive basis to produce numbers which are indicative of the amplitude of one signal modulated by the other before converting this multiplied signal to an analog version in a digital to analog converter.

It is therefore an object of the present invention to provide an improved modulator.

Other objects and advantages of the present invention will be apparent from a reading of the specification and claims in conjunction with the drawings wherein:

FIG. 1 is a block diagram of the basic concept of the invention;

FIGS. *2a–c* and *2d* are a set of waveforms and a chart for use in explaining FIG. 1;

FIG. *3a–e* are a further set of waveforms for explaing a more complicated version of the invention;

Figure 4:
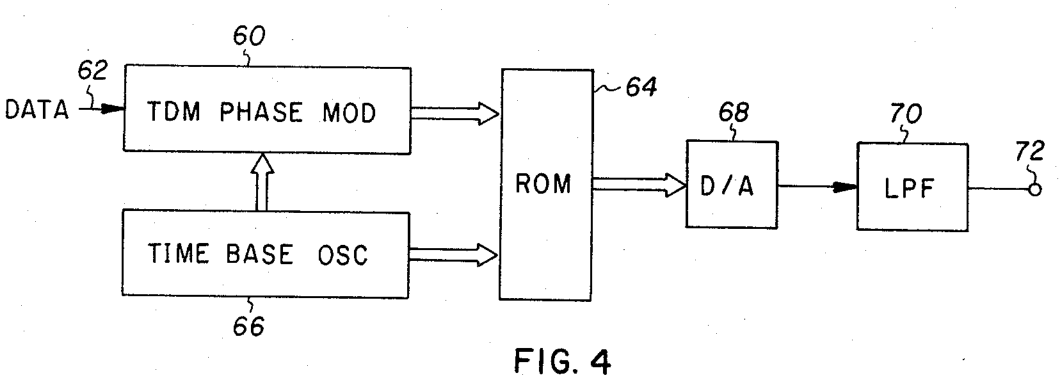
FIG. 4 is a block diagram of one embodiment of the invention.
Figure 9:
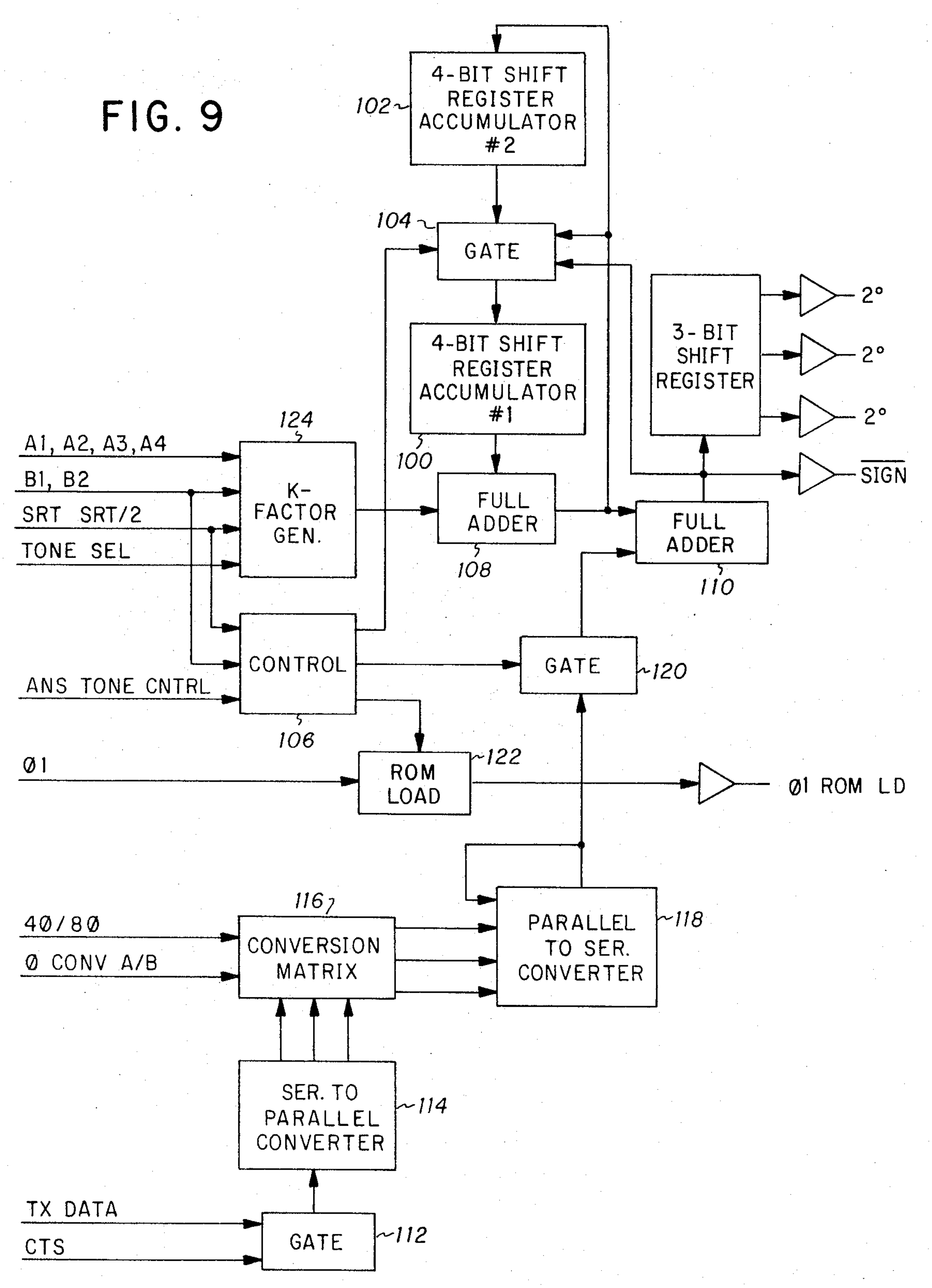
FIG. 9 is a block diagram of the TDM phase modulator portion of FIG. 4.
Figure 11A:
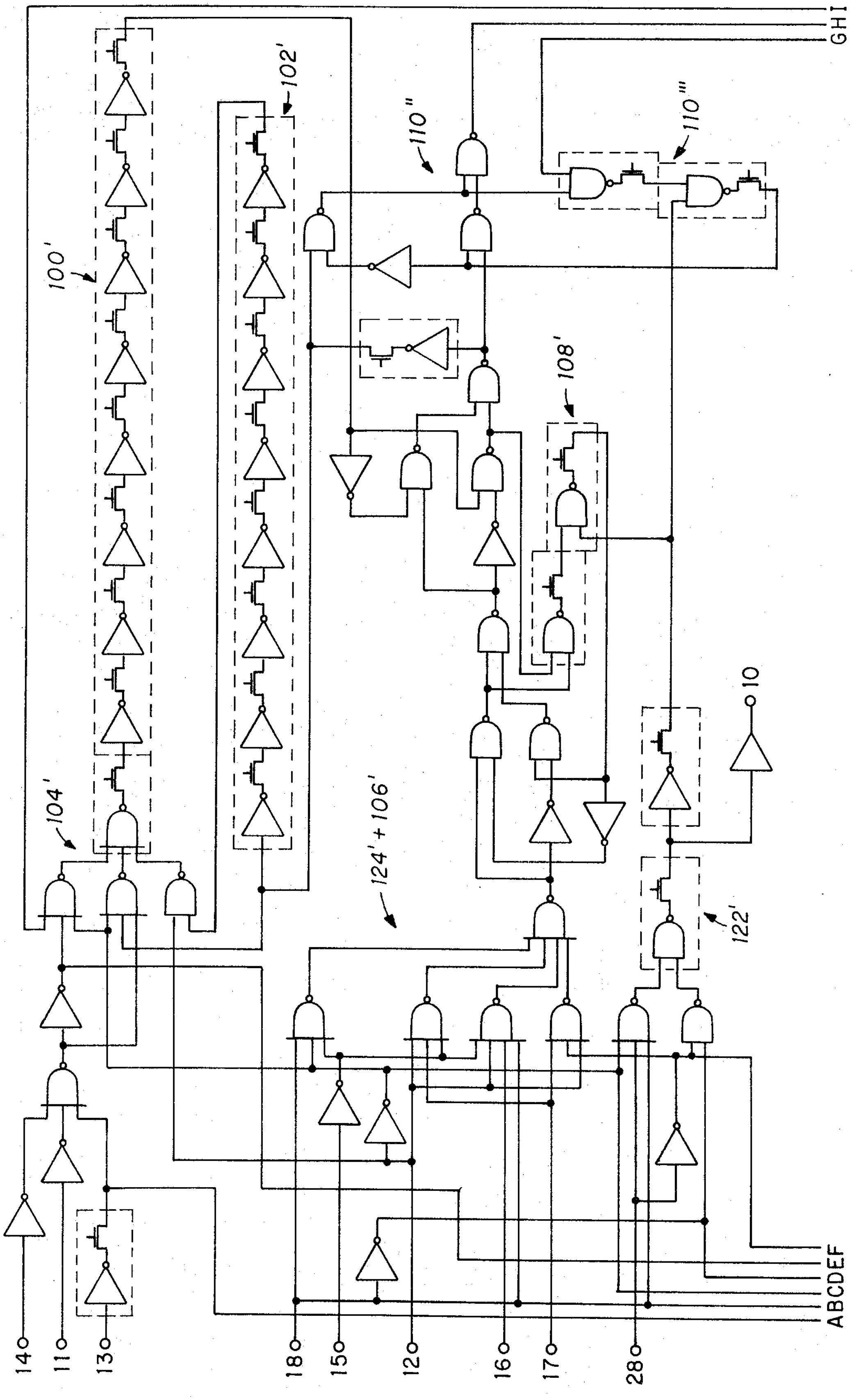
Figure 11B:
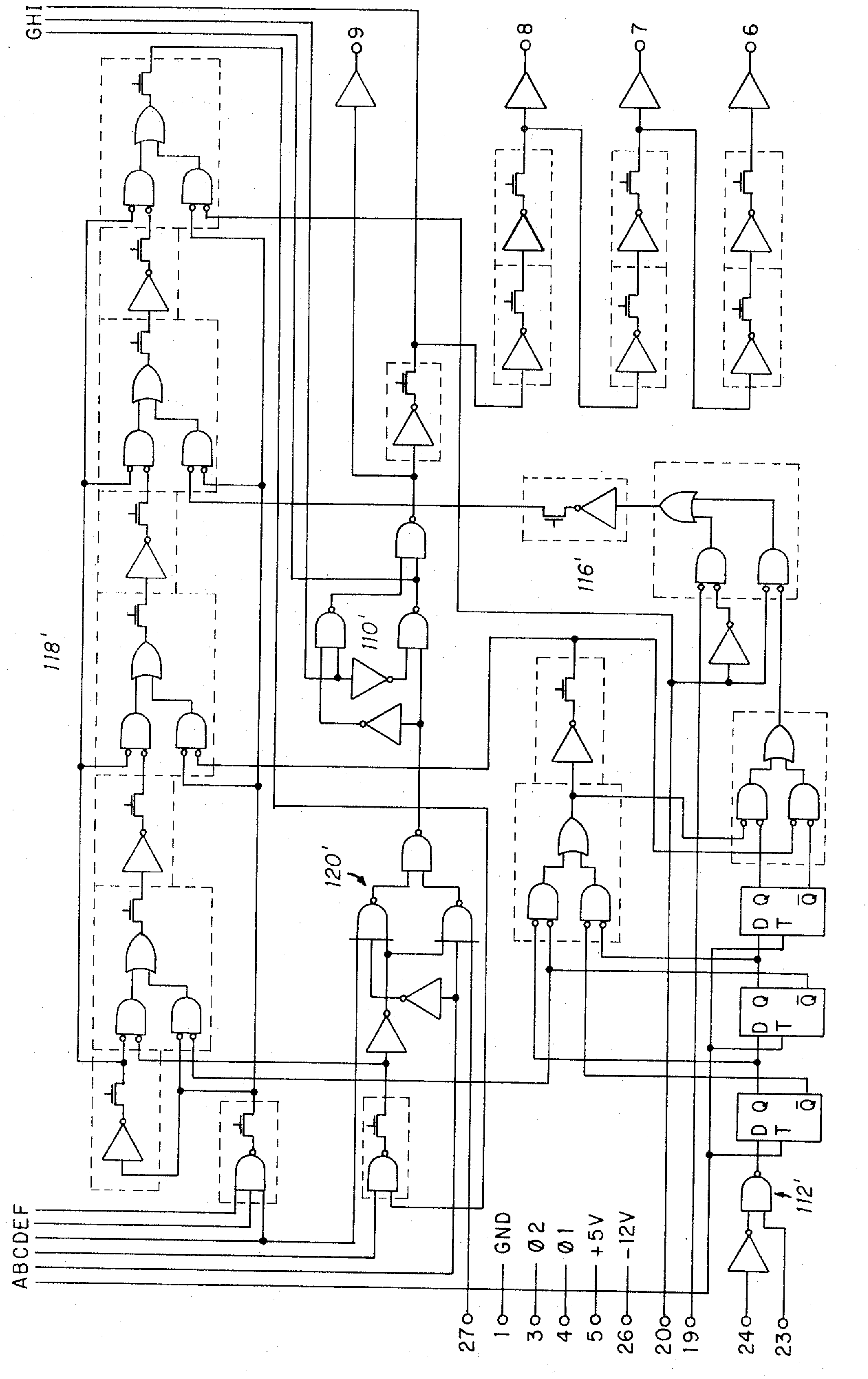

FIGS. 11*a* and 11*b* are a detailed diagram of the apparatus of FIG. 9; and FIGS. 12*a* and 12*b* are tables illustrating the programming of the ROM of FIG. 4 for one embodiment of the invention.

Returning now to FIG. 1 it will be noted that a first digital number signal generator 50 supplies an input to a read-only memory or ROM 52 whose output is supplied through a digital to analog converter 54 to a filter 56. A second digital number signal generator number 2 is designated as 58. It also supplies inputs to the ROM 52.

Although many different types of series of digital numbers may be supplied to the ROM 52, FIG. *2a* illustrates in waveform format a periodically recurring waveform which is divided into 24 phase designations before repeating. This FIG. *2a* waveform represents the positive portion of a raised cosine signal having a weighting function as shown in equation 1.

$$\text{Weighting Function } A = (.707 + \text{Cos } W_{mt})/1.707 \quad (1)$$

Each of these designations as shown has 15° spacing. The signal supplied by generator 58 is a digital number indicating phase angle and which is effectively converted in the look-up table of the ROM 52 to an amplitude number as represented in the figure. Waveform *2b* is representative of the signal that may be supplied from generator 50 and may be expressed as $\cos[Wct + \phi(t)]$. As illustrated here, there are eight possible phase outputs provided for this signal. Thus, each phase increment is equivalent to 45° of the waveform of FIG. *2b*. As further illustrated, three cycles or 1,080 electrical degrees of the carrier A waveform in FIG. *2b* is equivalent to 360° or one full cycle of the weighting function of the waveform in FIG. *2a*. The chart of FIG. *2d* is a simple table based upon the outputs of the two generators 50 and 58. As illustrated, the generator 50 would provide the outputs which are illustrated as R through Y in the alphabet. It should be noted, however, that only R–U is shown in the table since V–Y are negative duplicates thereof. These correspond respectively to the 0, 45°, 90°, 135°, etc. phase positions of the waveform of FIG. *2b*. The same phase positions are labeled to correspond both in FIGS *2b* and *2d*. As illustrated the output of generator 58 is such that only even numbers are outputted to correspond in time with the outputs of the generator block 50. Thus, the ROM 52 will provide an output to the *d/a* converter 54 which corresponds with the product of the signal amplitudes represented by the digital representations of phase at the input.

As an example, it will be noted that at counts zero through four of waveform *2a*, the amplitude of the signal represented by the phase indications is zero. Thus, the answer must be zero regardless of the phase of the signal as supplied by generator 50. It may be noted that there is a zero amplitude product illustrated in FIG. *2c* as the output which may be obtained from the digital to analog converter 54 or alternatively from the filter 56 during these interval time periods. Reference to FIG. *2d* will illustrate that the answer in the look-up table at the intersections of counts 0 and R and also at the intersection of counts 2 and S, 4 and T and 6 and U are zero. The amplitudes shown for the waveform of FIG. *2a* are those which would be obtained through the use of the raised cosine weighting function of equation 1. Thus, the lool-up table is programmed or designed to transform the two digital numbers representing phase or in other words phase information into amplitude information while at the same time multiplying the amplitude information by one another to thereby obtain as an output a waveform such as shown in FIG. 2*c* when the amplitudes of the two input signals would be such as shown in FIGS. 2*a* and 2*b*.

Figures 2A, 2B:
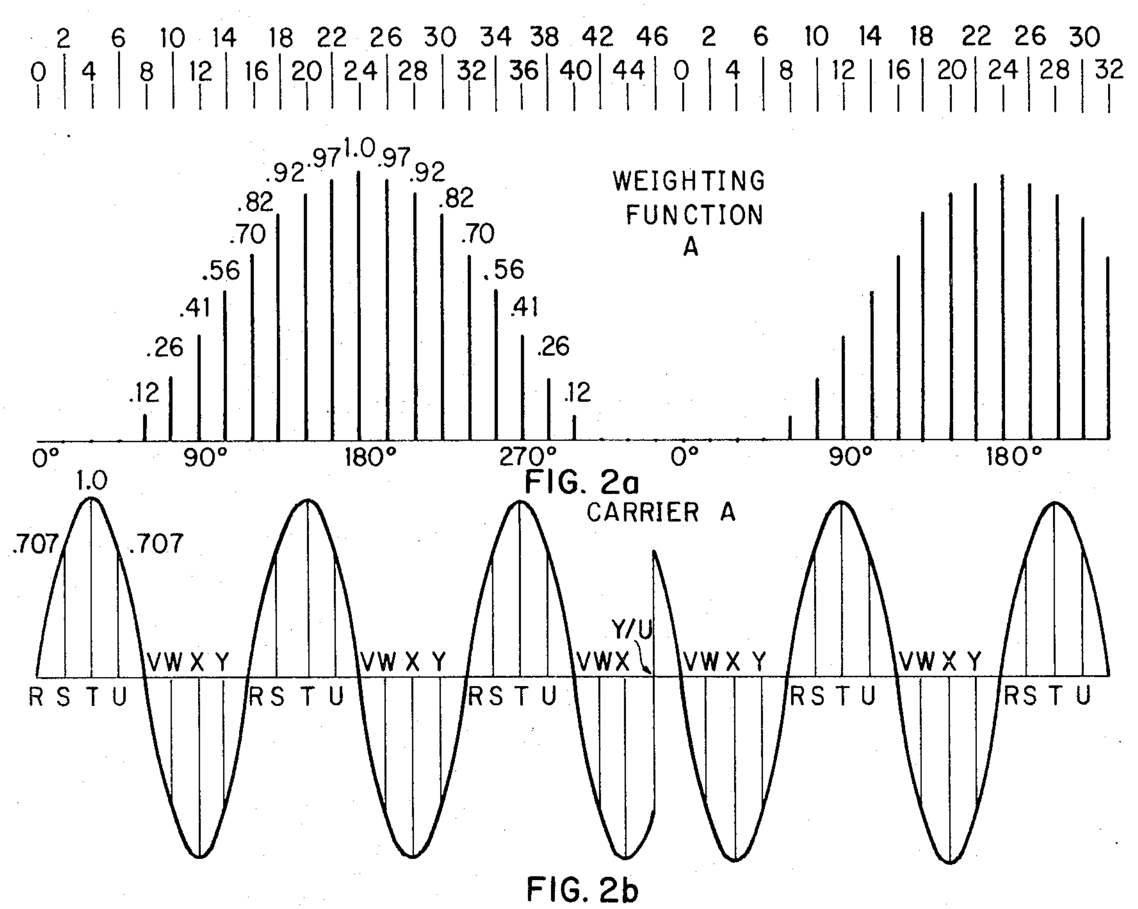
Figure 2C:
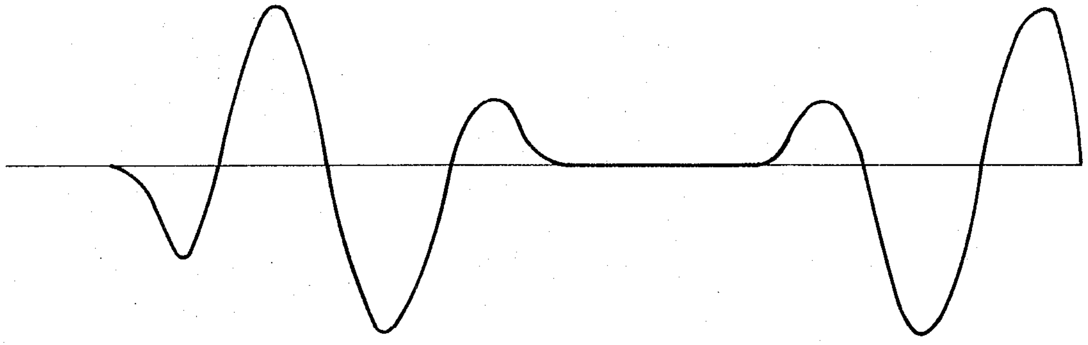
Figure 5:
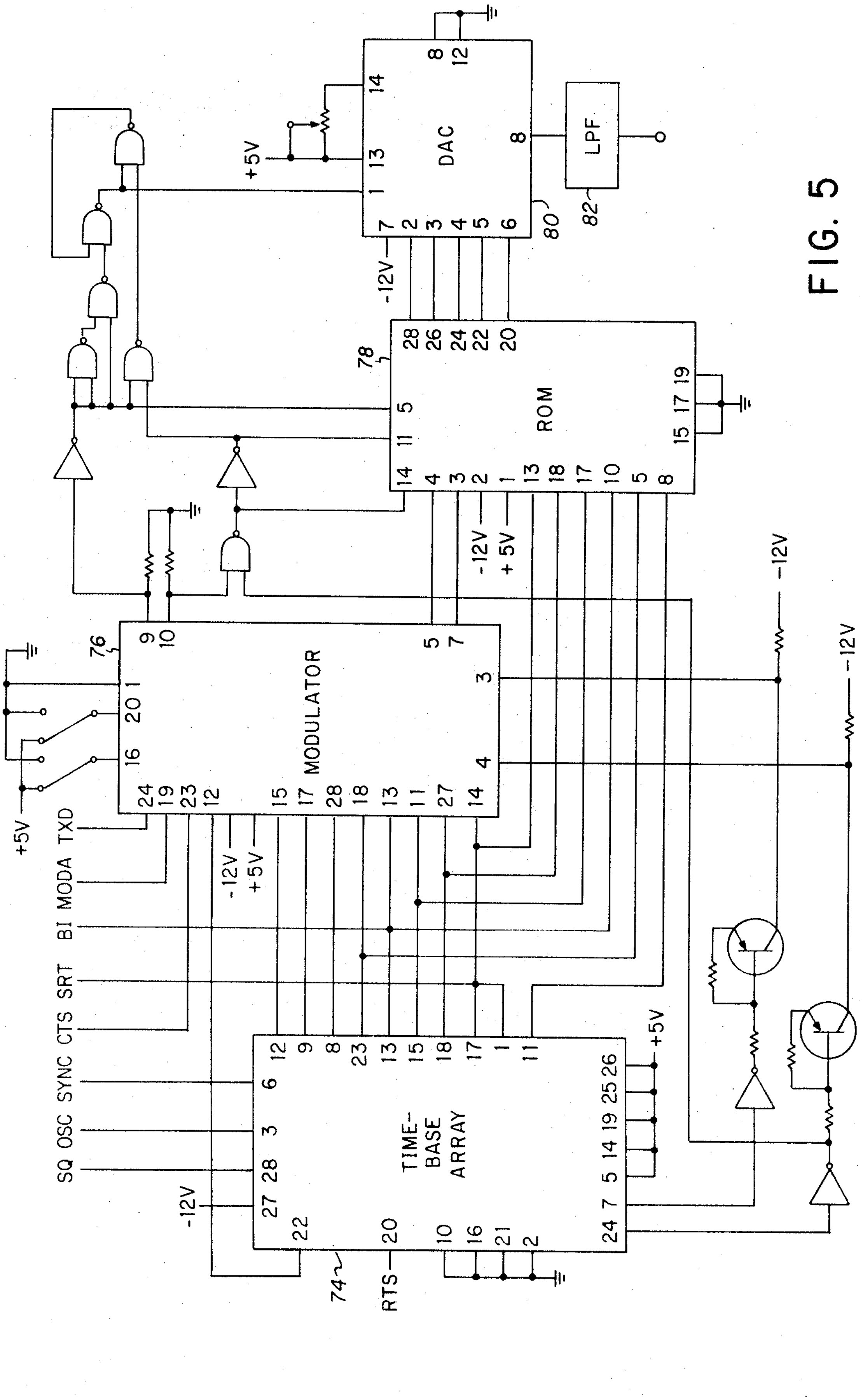
FIG. 5 is a more detailed block diagram of FIG. 4.

FIG. 2*b* was prepared for use in illustrating the more complex version of FIG. 5 and thus at the time of occurrence of the second count zero of FIG. 2*a*, the waveform of FIG. 2*b* abruptly changes phase by 270° and produces a discontinuous output. At the count of zero this output may either be a Y, thereby representing a −.707 amplitude output, or a U thereby representing a +.707 output. As illustrated in the resultant signal of FIG. 2c there is no difference since it is the product of the signals of waveforms FIGS. 2*a* and 2*b* wherein FIG. 2*a* at that time has a zero amplitude.

The digital to analog converter 54 will take the numbers which occur in the look-up table of FIG. 2*d* and convert these to an analog value which may then be filtered by filter 56 to produce an output which is free from extraneous and undesired frequency components. In most instances the filter 56 will be a low pass filter to prevent the appearance in the output of higher frequency signals caused by the discontinuity in the output signal amplitudes of the digital to analog converter 54.

Figure 1:
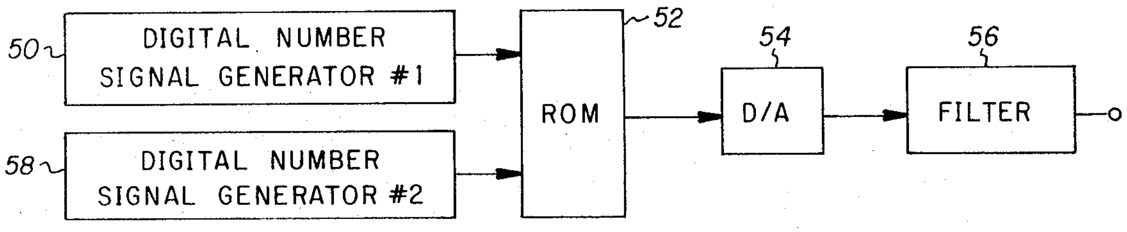

The ROM 52 as well as further references to ROM's may be any of various types sold in the industry and may be a 512 word read only memory as supplied by Collins Radio Company of Newport Beach, California. The D to A converter 54 may again be any of various types, one type of which was used was designated as DAC-01H and produced by Precision Monolithic, Inc., of Santa Clara, California. The filter may be any of many low pass filters to eliminate higher frequency components. The signal generators for the basic concept as illustrated in FIG. 1 may be repetitive counting circuits which count to a given number and repeat on a periodic basis for modulation of a carrier with no alterations in phase. A U.S. Pat. No. 3,597,599 in the name of William Melvin and assigned to the same assignee as the present invention illustrates a technique for generating each of the two digital number outputs. Modulation of the phase can be accomplished by using further teachings of this patent.

As a summarization of the description of FIG. 1, it will be realized that the inventive concept involves the use of a look-up table or other means for accomplishing multiplication of two phase representing digital input numbers to produce an output which is an analog or digital equivalent of the product of the signals represented by the phase representative numbers. The reason for using phase representative numbers, as emphasized in the above-referenced Melvin patent is that it is easier to generate and manipulate signals when they are represented by values which equally divide a signal. In other words, for illustrative purposes, the generator 50 could have generated outputs of 0, 0.707, 1.00, etc. and the generator 58 could have generated outputs of 0, 0.207, 0.707, 1.027, etc. However, the production of such outputs would be much more complicated than merely having repetitive counting circuits which will count to eight or 24 and repeat. As illustrated, in FIG. 2, the two counting circuits count from 0 to 46 and 1 to 47 by two's and from 1 to 8 as illustrated by the designations R through Y. These two sets of numbers designate specific positions in the look-up table which, like the multiplication table of grade school days, provides the product of the symbolized inputs.

It may be further realized that since columns S and U of FIG. 2d are identical as would be columns R and V and W and Y, combinational logic could be utilized to reduce the physical size of the look-up tables. The embodiment illustrated in the following description did not make use of this apparent ability to reduce the physical size of the table because of technical considerations and also due to the fact that read only memory of sufficient capacity was easily available.

Figures 3C, 3D, 3E:
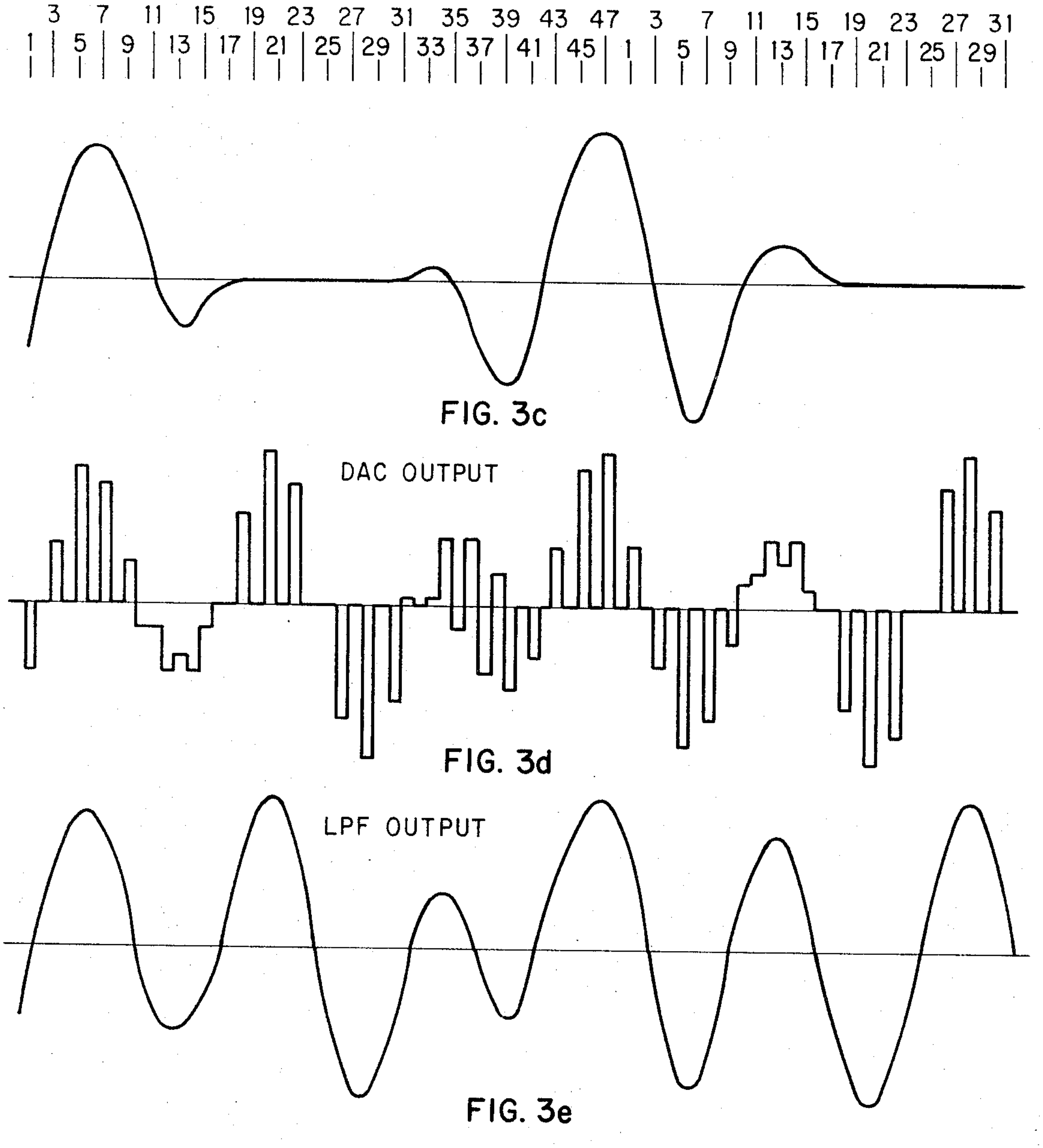

While FIG. 2*a* illustrated both used and unused counts, FIG. 3*a* illustrates only the counts applicable to the waveform of FIG. 3*b*. As will be noted, the FIG. 3 waveform representations used the odd counts whereas FIG. 2 utilizes the even counts. In the same manner that FIG. 2*c* is representative of the product of FIGS. 2*a* and 2*b*, FIG. 3*c* is representative of the product of FIGS. 3*a* and 3*b*. As will be later discussed, FIGS. 3*d* and 3*e* are composite illustrations of the amplitudes of the signals to be obtained from the digital to analog converter if the digital inputs represented by FIGS. 2*c* and 3*c* were time multiplexed and applied thereto.

The waveforms of FIGS. 3*a*, 3*b* and 3*e* may be represented by equations 2, 3 and 4 as presented below.

$$\text{Weighting Function } B = (.707 - \text{Cos } W_{mt})/1.707 \quad (2)$$

$$\text{Carrier B} = \text{Cos}[Wct + \phi_2(t)] \quad (3)$$

$$\text{Output} = (\text{Carrier } A)\ (\text{Weighting Function } A) + (\text{Carrier } B)\ (\text{Weighting Function } B) \quad (4)$$

Where

Wc = Carrier Frequency = $2\pi[1{,}800]$ $\phi_1$ = Carrier $A$ phase shift $\phi_2$ = Carrier $B$ data phase shift $W_m$ = Weighting Function Frequency = $2\pi[600]$ FIG. 4 illustrates a time division multiplex phase modulator 60 having a data input lead 62 and a plurality of output leads to a read-only memory 64. A time base oscillator 66 provides a plurality of inputs to modulator 60 and a further plurality of inputs to ROM 64. A plurality of outputs from ROM 64 are applied to a digital to analog converter 68 and an output is supplied through a low pass filter 70 to an output terminal 72. The devices 64–70 correspond respectively to devices 52–56 of FIG. 1. Further, the blocks 60 and 66 correspond to blocks 50 and 58 of FIG. 1. As indicated supra, the illustrated embodiment utilizes time division multiplex and block 60 provides as outputs a repetitive series of signal waveform indications representative of data received on line 62 during the times corresponding with the even counts from oscillator 66 and another, multiplexed or interleaved, series of outputs corresponding in time to the odd counts from oscillator 66. Thus, the output from block 60 may comprise the phase indicative outputs as represented in FIGS. 2*b* and 3*b*. The inputs to the D to A converter 68 from ROM 64 would be the indications as shown by FIGS. 2*c* and 3*c* for the respective counts corresponding to the input signals to ROM 64 and are indicative of the product of the signals represented by the phase representative input digital numbers.

In FIG. 5 a time base array block 74 corresponds to block 66 of FIG. 4. A modulator block 76 corresponds generally to modulator 60 of FIG. 4 while block 78 is a ROM corresponding to 64 of FIG. 4. Finally, a digital to analog converter 80 and a low pass filter 82 correspond generally to the similarly labeled blocks in FIG. 4. Each of the blocks 74–80 in FIG. 5 have a plurality of pin numbers. These are the pin numbers used on the MOS chips utilized in building the apparatus and have been retained for simplifying the presentation to anyone desiring to duplicate the embodiment presented in detail. Lead 7 of array 74 is supplied through an inverting amplifier, a resistor, and a transistor to an input 3 of modulator 76. Lead 24 is passed through similar circuitry to an input 4 of modulator 76. These two circuits provide a voltage translation from the voltages supplied by the array 74 to those required by the modulator 76. The signals supply timing inputs of phase 1 and phase 2 to the modulator which has two phase logic. An input, MODA at pin 19 is used to set the modulator initially to a given phase convention which is not pertinent to the present discussion but allows the transmitter to be utilized in either one of two modes depending on the characteristics of the receiver. This setting is normally accomplished at the time of purchase of equipment and is usually not further adjusted thereafter. In other words, the equipment normally operates in one phase mode and is never changed. The plurality of NAND gates and inverters between pin 9 of modulator 76 and pin 1 of the digital to analog converter 80 comprise a sign bit gate and latch device which acts in the same manner as an RS flip-flop. In other words, an RS flip-flop would operate equally well to provide to the digital to analog converter the sign of the number being supplied thereto from the ROM 79. The double-pole double-throw switch illustrated above the modulator 76 is utilized to change the modulator from a four-phase to an eight-phase unit. The device as described will be only a four-phase unit. However, it has the capability of operating as an eight-phase unit. The NAND gate and inverter connected between pin 10 of modulator 76 and pin 11 and pin 14 of the ROM 78 provide the action of clocking input to indicate to the ROM when to utilize the inputs to select a particular value in the look-up table.

The ROM used to fulfill the contents of block 78 has a capacity of only a five bit word. The desired definition was such that the entire five bits were required for amplitude definition. Thus, the sign bit was applied not only to the ROM but also to the digital to analog converter. If a ROM with a six bit word capacity were utilized, the complicated sign bit and latch circuit would not be required.

Figures 6, 7:
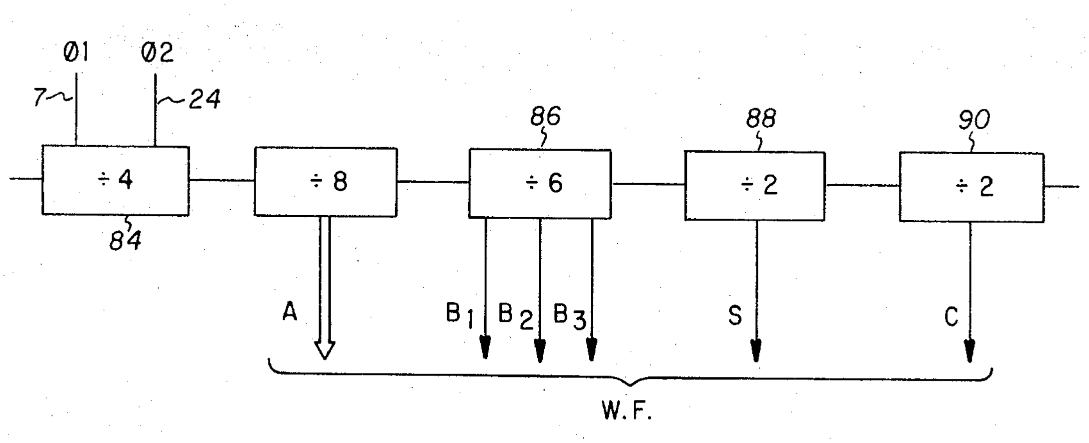
FIG. 6 is a block diagram of the oscillator portion of FIG. 4.
FIG. 7 is a table illustrating the output obtained from the oscillator of FIG. 6.

FIG. 6 is a more detailed description of the time base array block 74 of FIG. 5. As illustrated, a high frequency input signal is applied to a divide by four block 84 which has two outputs designated as pin numbers 7 and 24. These are the two outputs previously discussed in connection with FIG. 5. The output of divide network 84 is divided by eight to provide the output labeled A. The A output is actually four separate signals A1 to A4. This output is then further divided in a special divide by six unit 86 whose output at 2,400 cycles is divided by divide by two unit 88 and further divided in a divide by two unit 90 before having a 600 cycle per second output as labeled C. The output from block 88 is labeled S and the outputs from the device 86 are labeled B1, B2 and B3.

FIG. 7 is a table illustrating the digital equivalents of the outputs from blocks 86–90. As will be noted, the three outputs from block 86 are 120° apart and a complete cycle of outputs from block 86 is indicated by the bracket. The zero designations indicate a low output and the one indications indicate a high output. To reduce the length of the table, it has been broken up into two parts with the first four outputs B1 through S repeating for the two outputs $C_1$ and $C_2$. In the chart $C_1$ the output is continuously zero for the first 12 counts. It will be noted that the decimal equivalent of these values for the first 12 counts do not proceed in the normal order. Rather, the decimal equivalent is 0, 1, 3, 7, 6, 4, 8, 9, 11, 15, 14 and 12.

For the condition illustrated in $C_2$ where the output of block 90 is a logic 1, counts 13 through 0 are obtained. Again. the decimal equivalent is illustrated at the output. The significance of these decimal equivalent outputs will be ascertained from later descriptions in connection with the programming of the ROM as completed in the embodiment of the invention shown.

Figure 8:
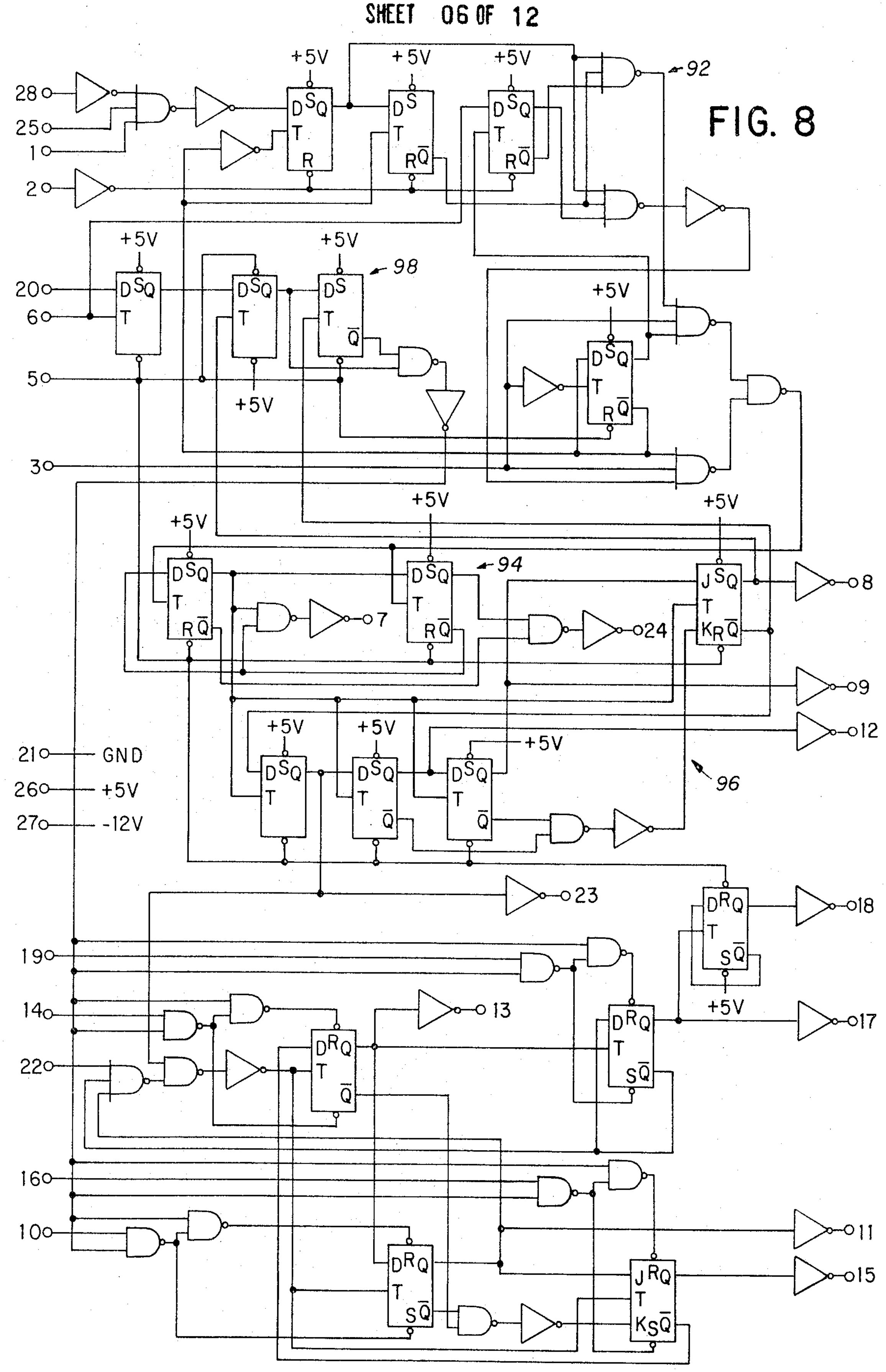
FIG. 8 is a detailed schematic diagram of the apparatus shown in FIG. 6.

Referring now to FIG. 8 an even more detailed version of FIG. 6 is illustrated. In this FIG. a plurality of DT or delay flip-flops are utilized. A delay flip-flop is characterized by providing an output which is delayed with respect to its input. Otherwise it is substantially identical to a JK flip-flop. The inputs applied to pins 1, 25 and 28 are connected to a plurality of delay flip-flops designated generally as 92 which comprise a slow sync circuit to add or delete pulses as obtained from the outside oscillator source applied to pin 3 of FIG. 8. The incoming signal in the embodiment illustrated was 921.6 Hz and the output was 460.8 Hz. The slow sync circuit 92 would add or delete pulses periodically to provide an adjustment of the incoming signal. The divide by four set of flip-flops is designated generally by the designator 94. The next four flip-flops designated generally by 96 constitute a divide by eight block. The three flip-flps connected to output pins 13, 11 and 15 constitute the divide by six block 86 of FIG. 6. The flip-flop connected to output pin 17 represents block 88 of FIG. 6 while the flip-flop having output terminal 18 represents the divide by two block 90 of FIG. 6. Near the top of FIG. 8 is a plurality of three flip-flops designated generally as 98 and constitute a fast sync circuit for abruptly changing the count of the array for correction of gross errors. Input pins 10, 14, 16 and 19 are used in an embodiment of the invention to minutely adjust the phase of the output signals. This will not be explained further since it is completely outside the scope of the inventive concept. The lead connected to input pin 22 operates to stop operation of the time base array so that the transmitter may produce an answer tone to be later referenced briefly. The lead attached to input pin 5 is a test lead and is not pertinent to the present description. The leads attached to pins 2 and 6 are part of the slow sync circuit while the lead attached to pin 20 is part of the fast sync circuit. The fast sync circuit operates in conjunction with the four inputs for adjusting the phase of the sync when the device is being resynchronized on a gross error basis. The pins 21, 26 and 27 provide ground, +5 volts and −12 volts to points within the circuit where it is needed and due to the plurality of connections are not shown connected.

FIG. 9 is a more detailed embodiment of the modulator 76 of FIG. 5. In FIG. 9 first and second accumulators 100 and 102 are connected via a gate 104. Gate 104 has a select input from a control block 106 and has a second input from a full adder 108. A final input is from a full adder 110. The output of full adder 108 is also supplied to the input of accumulator 2. The input of full adder 108 is received from accumulator 100. The output of full adder 108 is also supplied as an input to full adder 110. The output of full adder 110 is also supplied through an amplifier to provide the sign output at pin 9 and is applied to a three-bit shift register for connecting three outputs therefrom to pins 6, 7 and 8 as illustrated more completely in FIG. 10. These three outputs on pins 6–8 represent respectively the first, second and most significant bits supplied from the modulator to the ground. Data to be transmitted is supplied to the modulator through a gate 112 in combination with a clock input and supplied to a serial to parallel converter 114. The serial to parallel converter 114 accepts each pair of input data bits and converts these to a three-digit number in parallel format to a conversion matrix 116. The conversion matrix 116 has the inputs previously mentioned of four and eight phase and also of convention A and B. For the purposes of the present invention this is set at a given convention and for four phase as explained in the description to follow. The output of the conversion matrix is then supplied to a parallel to serial converter 118. The output of the converter 118 is recirculated around the converter and supplies a serial designation to a gate 120 which is a three-bit word representative of the phase of a pair of input data bits as represented by a conversion code with respect to the coded representation of the last pair of bits. An output of control 106 is also supplied to gate 120 whose output is supplied to full adder 110. The control 106 deactivates gate 120 if the answer tone previously mentioned is to be generated but at all other times allows passage of the signal from the converter 118 to full adder 110. The control 106 also supplies a signal to a ROM load gate 122 which supplies an output to pin 10 of the modulator for supplying an indication to the ROM 78 that all the outputs are valid. In other words it acts much as a clocking signal. A block 124 is a K factor generator operating much in the same manner as the K value generator of the above-referenced Melvin patent. This generator 124 has inputs from the divide by eight block of FIG. 8 which are used to produce the outputs from generator 124 at the correct time. Also, inputs are provided from the pins 13 and 15 of block 74 for determining the bit rate. Symbol rate timing and tone select inputs are also supplied to block 124. Although the details of the modulator FIG. 9 are not important to the inventive concept, they will be described briefly. The K factor generator 124 has a function of developing binary numbers, which when added to an accumulator, generates a new phase factor. The rate at which the phase factor advances determines the frequency. The timing required for the K factor generation comes from the time base block 74 and is controlled by the generator 124.

The phase modulator accepts serial transmit data into the gate 112 and in converter 114 provides a serial to parallel conversion to obtain one symbol from two other bits. The data symbol is coded into a four-bit word in matrix 116 and then is converted from a parallel word to a serial word in converter 118. The four-bit serial word is then added in full adder 110 to a carrier phase word which is stored in accumulator 100 to produce a phase shifted carrier phase word. The four-bit serial word is continuously recirculated around converter 118 for a full symbol duration. On alternate counts of the time base generator 74 of FIG. 5, this word is added to the word stored in accumulator 100 for providing outputs to the ROM 78 of FIG. 5.

An accumulator 102 is illustrated which is used in combination with accumulator 100 to provide an eight-bit shift register which operates in a modulo 256 format with the data phase shift adder 110 being effectively disabled by the deactivation of gate 120 to prevent data from being applied. The four most significant bits are shifted into the three-bit shift register for outputting on pins 6 through 8 of the modulator as well as at pin 9 which is the sign bit. The four least significant bits are dropped upon each application to the ROM.

Basically, the answer mode is merely the generation of a constant frequency signal without modulation and thus acts much as the tone generator of the above-referenced Melvin patent.

In the normal data mode the accumulator 100 may receive inputs from either full adder 108 or adder 110 as well as from accumulator 102. For convenience, the signal of FIG. 2 may be called channel A whereas the signal of FIG. 3 may be called channel B. The phase modulation of FIG. 9 comprises the phase shift of one channel with respect to the other. During one modulation interval, channel A will be a data fixed number of degrees ahead of channel B. During the next modulation period channel B advances in phase to a data predetermined number of degrees ahead of channel A. In the following period channel A again moves ahead of B. When one channel is to advance, it becomes the secondary channel or in other words the one which has a phase with respect to the referenced phase as stored in converter 118. The referenced phase is stored in 100. At the end of a symbol, the word stored in converter 118 is then added to the word stored in 100 and the previously added channel now becomes the reference channel and the previous reference channel obtains a new word from the data which is added to the reference channel so that it is now of a phase which is ahead of the reference channel phase.

Figure 10:
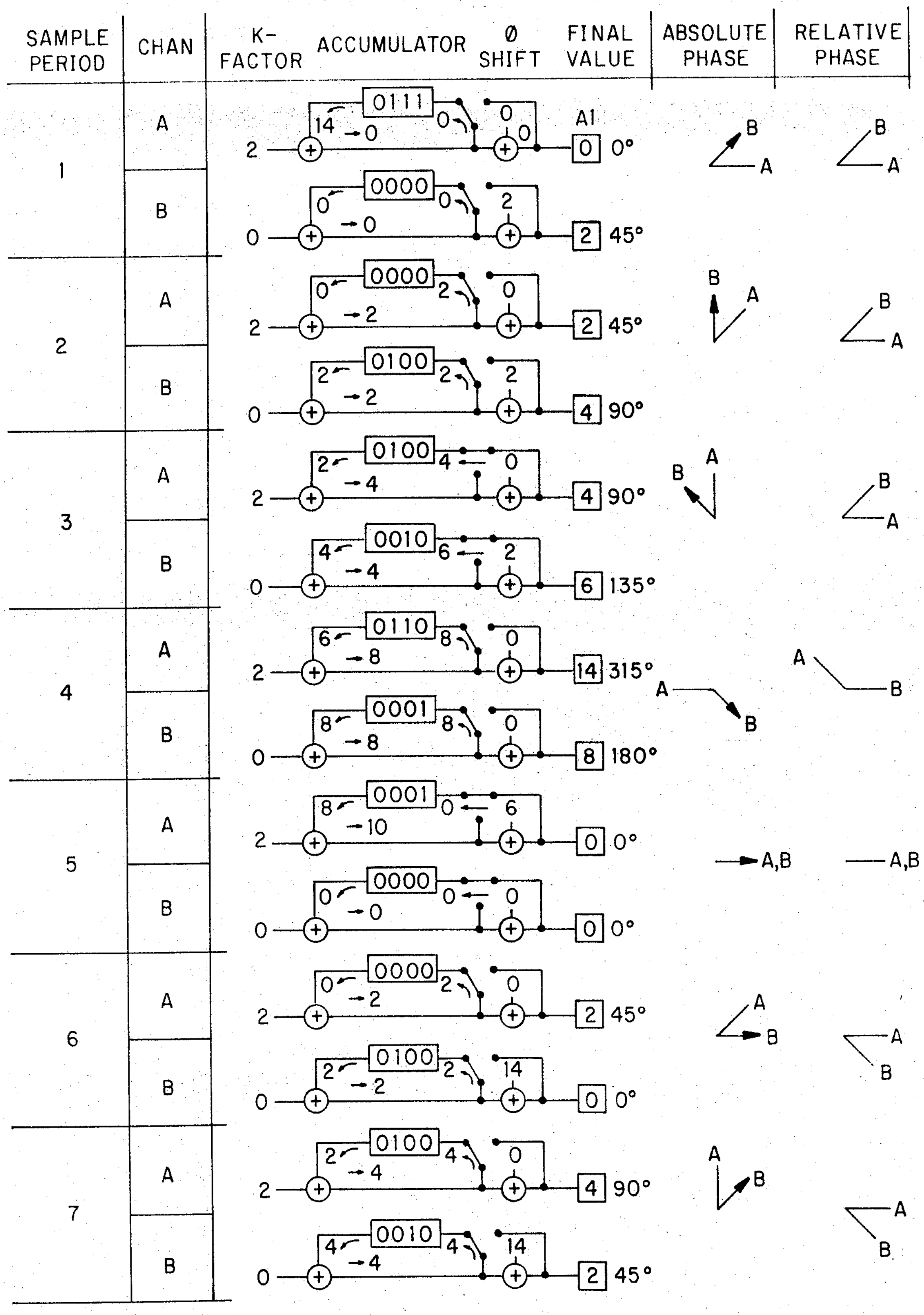
FIG. 10 is a phasor diagram for use in explaining FIG. 9.

FIG. 10 is illustrative of the phase shift portion of FIG. 9 with the indicated accumulator being an accumulator 100 and the switch being gate 104. The left hand circle with a + contained therein is the full adder 108 while the right hand circle with a + is full adder 100. The upper input to the right hand full adder is, of course, the phase shift information from converter 118 while the horizontal input to the left hand full adder is that obtained from the K factor generator 124.

FIG. 10 is a series of sample intervals during portions of three symbol periods. As illustrated, the states of the circuit are shown, the absolute phase of each channel is shown and the relative phase of the secondary channel with respect to the reference is shown. It should be realized that the number of sample intervals per symbol period has been drastically reduced from that actually incurred for demonstation purposes. In other words, for the embodiment shown each symbol would have 12 occurrences of channel A and 12 occurrences of channel B before the interchange of references as shown in sample periods 3 and 5.

The numbers shown in FIG. 10 correspond to the binary numbers which appear at that particular point in the functional diagram. For example, in the first diagram, (1A), the accumulator contains number 14 base 10, which, of course, is (1110) base 2, (the figure has the least significant bit first) a phase factor of 2(0010) is modulo 16 added to the accumulator, giving 0(0000). The value of 0(0000) is recirculated to the accumulator and a phase shift of 0(0000) is added to 0(0000) to give a ROM output of 0(0000). This corresponds to a channel A output of 0°. In the second diagram (1B), the phase factor 0(0000) is added to the accumulator contents 0(0000), and the result 0(0000) is recirculated in the accumulator. This same result is summed with a phase shift factor 2(0010), resulting in a ROM output 2(0010) which corresponds to an absolute phase of 45°. This same process is repeated in sample periods 2A and 2B of FIG. 10 resulting in absolute phase outputs of 45° and 90° for channels A and B respectively. Sample periods 3A and 3B show a phase update cycle where the accumulator receives the phase of channel B, 6(0010). Channel B then becomes the phase reference and channel A contains data phase shift information as illustrated in sample periods 4A and 4B. Sample periods 5A–5B comprise an update cycle after which channel A is the reference and channel B contains the data phase shift. As previously indicated, the sample period illustrated as 4A–4B would normally be 8 separate sample periods, but has been abbreviated for demonstation purposes.

Although not important to the basic concept of the invention, the conversion matrix 116 is operable to transmit the data in one of two phase conventions. One convention takes two consecutive bits 00 for one symbol period and produces a four-bit digital number representative of 0°. The data bits 01 are transformed to produce a four-bit word indicative of 90°, the two-data bits 11 in a symbol period represent 180° while the data bits 10 represents 270°. For the other phase convention each of the above referenced data bits are transformed to represent angles shifted 45° in the positive direction from those referenced above. For four phase data conversion the least significant bit in each instance would be a 0. If the phase modulator were to be utilized in an eight phase condition, all of the four-bits would of necessity be used to distinguish the eight phase positions.

FIGS. 11*a* and 11*b* comprise a more detailed schematic of FIG. 9. Many of the same numbers have been used to indicate areas illustrating the various portions of FIG. 9 except that a prime has been added. In other words 100′ is used to illustrate accumulator number 1 and 102′ is used to illustrate accumulator 102. The three sets of inverting amplifiers and FETs which are connected respectively to output terminals 6, 7 and 8 comprise the three-bit register and its output amplifiers. Terminal 9 is the sign bit output. The portions 110′ on FIG. 11b and 110″ and 110‴ on FIG. 11*a* constitute the full adder 110 of FIG. 9. The portion of 11*b* labeled 120′ is the gate 120 of FIG. 9. The portion of FIG. 11*a* labeled 108′ comprises the full adder 108 of FIG. 9. The ROM load 122′ is shown on FIG. 11*a*. The various AND gates having inputs 12, 15, 16, 17, 18 and 28 and labeled 124′ and 106′ comprise the K factor generator and control of FIG. 9. Pin 24 provides the transmit data input and is connected to a gate corresponding to 112 of FIG. 9. The three flip-flops immediately to the right of this gate are D type flip-flops and comprise the serial to parallel converter. The circuitry immediately above and immediately to the right and generally designated as 116′ comprise the conversion matrix while the parallel to serial converter 118′ is illustrated at the top of FIG. 11*b*. The gate 104′ may be found on FIG. 11*a*.

In view of the explanation provided in connection with FIG. 9 and the remoteness of the described embodiment to the basic concept of the invention, further descriptive material is deemed unnecessary with respect to FIGS. 11*a* and 11*b*.

FIGS. 12*a* and 12*b* illustrate the format in which the ROM 78 of FIG. 5 was programmed. FIG. 12*a* is programmed for channel A whule FIG. 12*b* is programmed for channel B. Although digital numbers were actually used in the ROM, their decimal equivalents have been illustrated in FIGS. 12*a* and 12*b* for ease of illustration. The count on the left hand side of each of FIGS. 12*a* and 12*b* is the chronological order in which a given position in the ROM is accessed. The ROM position column refers to the actual digital number received from the time base array 74. The row of numbers across the top of this chart correspond to the letters R through Y of FIG. 2*b*. By comparison it will be noted that each of FIGS. 12*a* and 12*b* correspond in a larger scale to that of FIG. 2d.

As previously indicated, the detailed material is provided for teaching one skilled in the art how to build a particular embodiment. The embodiment copied was however far beyond the scope of the inventive concept which involved using two digital numbers representative of phases of two separate signals and combining these numbers in a conversion means for providing an output which is indicative of one of the signals modulating the other. As illustrated, this means comprises a ROM, a D to A converter and a filter. However, other means for providing this conversion and multiplication may be used. One such means is to convert the phase numbers to digital amplitude numbers for each of the phase generators and then supply these outputs to two separate digital to analog converters which are interconnected to provide the product output from one of said digital to analog converters.

It is, therefore, my intention not to be limited by the particular embodiment shown but only by the scope of the invention as outlined in the appended claims.

I claim:

1. Apparatus for providing an output signal which is modulated in accordance with another signal comprising, in combination:

first and second digital number generators for each providing a repeating series of digital number waveform representative signals; and further means, including input means and output means connected to said first and second number generators for receiving signals therefrom, said further means providing predetermined output signals at said output means thereof for each possible combination of signals to said input means, said output signals being indicative of a first signal waveform being modulated by a second signal waveform.

2. Apparatus as claimed in claim 1 wherein:

said further means further includes digital to analog conversion means for providing said output signals as an analog waveform.

3. Apparatus as claimed in claim 2 wherein:

said further means also includes filter means for removing erroneous frequency components from the output signal of said further means whereby the output signal is more nearly representative of the waveform of the signal of said first number generator as modulated by the waveform of the signal from said second number generator.

4. Apparatus as claimed in claim 1 wherein the frequency of repetition of said first number generator is different from the frequency of repetition of said second number generator and where the outputs of said number generators and the further means is configured such that the output signal of said memory means basically comprises a sine wave signal modulated in accordance with a raised cosine signal.

5. Apparatus as claimed in claim 1 wherein said first number generator comprises a time multiplexed device for providing at least two repeating series of digital number representation signals in time division multiplexed format; and said further means includes a read-only memory divided into two portions one of which is used in conjunction with one of the time division multiplexed signals and the other portion of which is used in conjunction with the other of said time division multiplexed signals.

6. Apparatus for providing an output signal indicative of the amplitude modulation of one signal by another signal comprising, in combination:

first signal generator means providing a repetitive series of output signals wherein each individual output signal is indicative in digital format of the phase of a carrier signal to be amplitude modulated;

second digital number generator means for providing a second repetitive digital number representative signal indicative of the phase of an amplitude modulating signal;

means, including input and output means, for providing an output signal representative of the product of two input signals wherein the input signals are phase representative and the output signal is indicative of the analog product of the signals represented by the digital phase information at the input; and means connecting said first and second digital number generator means to said last named means for providing input signals thereto.

7. Apparatus as claimed in claim 6 wherein said means for providing the product includes digital to analog conversion means and low pass filter means.

8. The method of obtaining a composite output signal representative of a first signal modulated by a second signal comprising the steps of:

designing a memory means to provide an output indicative of the product of two waveforms for each of predetermined numbers of waveform phase angles for each of the two waveforms; and supplying two inputs to said memory means, each input being representative of phase angles of separate waveforms.

9. The method of claim 8 comprising the additional steps of:

converting each output product of said memory means to an analog value; and low pass filtering the analog values to reduce discontinuities in the composite output signal.

* * * * *